US011157387B2

(12) United States Patent
Robinson et al.

(10) Patent No.: US 11,157,387 B2
(45) Date of Patent: Oct. 26, 2021

(54) SELECTIVE TRACKING OF REQUESTS THROUGH ENTERPRISE SYSTEMS BY MULTIPLE VENDORS WITH A SINGLE TRACKING TOKEN SCHEME

(71) Applicant: International Business Machines Corporation, Armonk, NY (US)

(72) Inventors: Katherine Jane Susan Robinson, Hants (GB); Alexander John Woodgate, Southampton (GB); Robert Conroy Jones, Southampton (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 84 days.

(21) Appl. No.: 16/735,885

(22) Filed: Jan. 7, 2020

(65) Prior Publication Data
US 2021/0209002 A1    Jul. 8, 2021

(51) Int. Cl.
*G06F 9/44* (2018.01)
*G06F 11/36* (2006.01)
*G06Q 10/06* (2012.01)

(52) U.S. Cl.
CPC ...... *G06F 11/3636* (2013.01); *G06F 11/3612* (2013.01); *G06Q 10/0633* (2013.01)

(58) Field of Classification Search
CPC ............. G06F 11/3636; G06F 11/3612; G06Q 10/0633

USPC ................................................. 717/120–122
See application file for complete search history.

(56) References Cited

U.S. PATENT DOCUMENTS

| 10,467,122 B1* | 11/2019 | Doyle ..................... G06F 9/453 |
| 2011/0088042 A1 | 4/2011 | Clementi et al. |
| 2011/0088045 A1 | 4/2011 | Clementi et al. |
| 2015/0052044 A1 | 2/2015 | Castagna et al. |

* cited by examiner

*Primary Examiner* — Chuck O Kendall
(74) *Attorney, Agent, or Firm* — Cantor Colburn LLP; Teddi Maranzano

(57) ABSTRACT

Aspects of the invention include receiving requests to be executed by a processing system, and receiving first stakeholder token from first monitoring agent and second stakeholder token from second monitoring agent, first and second stakeholder tokens being indicators to track at least one of the requests through the processing system. A tracking token is built for tracking at least one of the requests through the processing system, tracking token having a format acceptable by protocols of the processing system, tracking token including first and second stakeholder tokens and a unique correlator. Requests are transmitted to the processing system, where the tracking token is associated with at least one of requests in the processing system. Access is enabled to tracking information generated by the processing system associated with requests for the first monitoring agent based on first stakeholder token and for the second monitoring agent based on second stakeholder token.

25 Claims, 6 Drawing Sheets

FIG. 2 SYSTEM 200

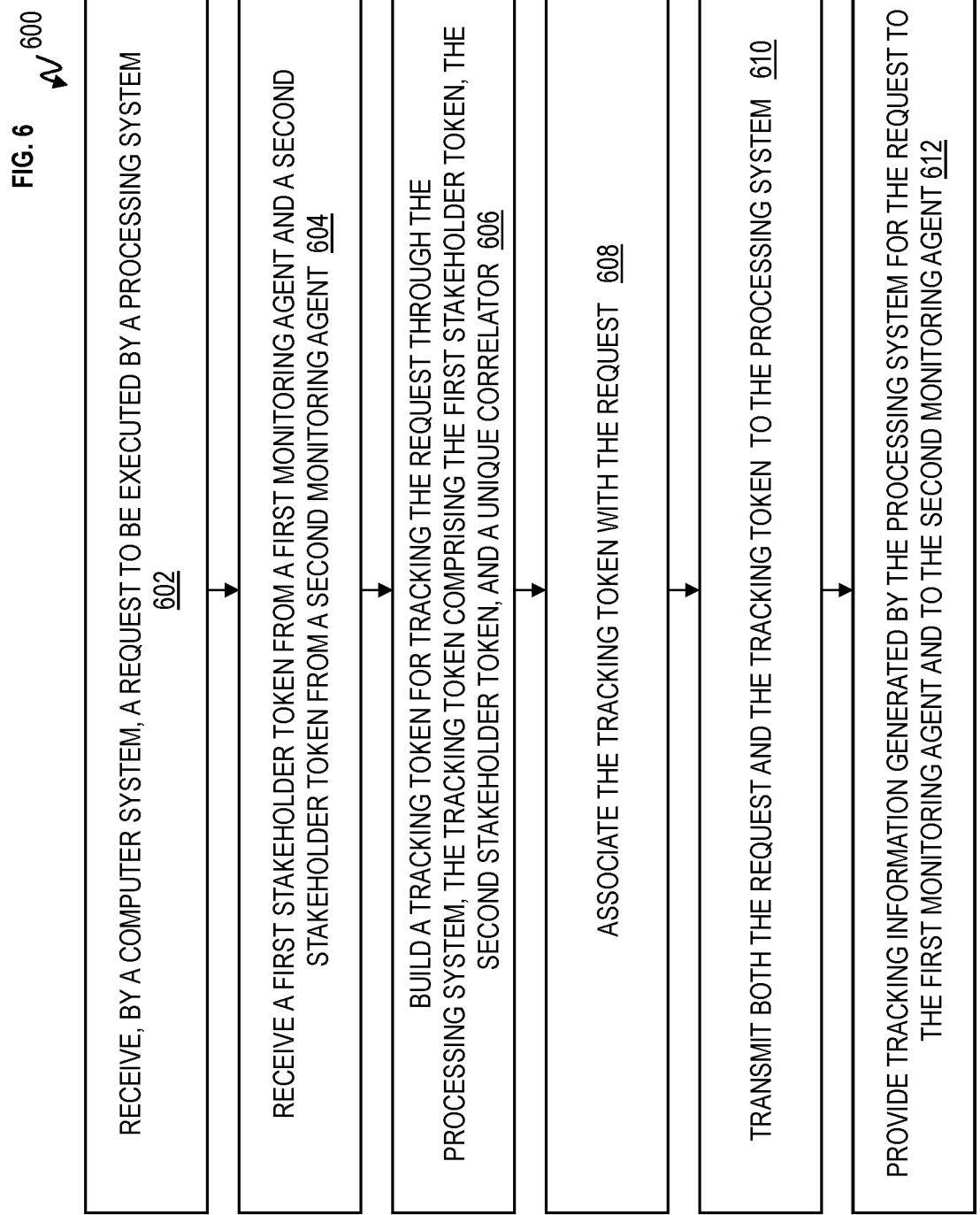

SELECTIVE TRACKING OF REQUESTS THROUGH ENTERPRISE SYSTEMS BY MULTIPLE VENDORS WITH A SINGLE TRACKING TOKEN SCHEME

BACKGROUND

The present invention generally relates to computer systems, and more specifically, to selective tracking of requests through enterprise systems by multiple vendors with a single tracking token scheme.

Enterprise software, also known as enterprise application software (EAS), is computer software used to satisfy the needs of an organization rather than individual users. Such organizations include businesses, schools, interest-based user groups, clubs, charities, and governments. Enterprise software is an integral part of a (computer-based) information system; a collection of such software is called an Enterprise system. Services provided by enterprise software are typically business-oriented tools, such as online shopping, and online payment processing, interactive product catalogue, automated billing systems, security, business process management, enterprise content management, information technology (IT) service management, customer relationship management, enterprise resource planning, business intelligence, project management, collaboration, human resource management, manufacturing, occupational health and safety, enterprise application integration, and enterprise forms automation. Generally, the complexity of these tools requires specialist capabilities and specific knowledge. Enterprise computing includes the IT tools that businesses use for efficient production operations and back office support. These IT tools cover database management, customer relationship management, supply chain management, business process management and so on.

SUMMARY

Embodiments of the present invention are directed to selective tracking of requests through enterprise systems by multiple vendors with a single tracking token scheme. A non-limiting example computer-implemented method includes receiving, by a computer system, requests to be executed by a processing system, and receiving a first stakeholder token from a first monitoring agent and a second stakeholder token from a second monitoring agent, the first stakeholder token and the second stakeholder token being indicators to track at least one of the requests through the processing system. The method includes building a tracking token for tracking the at least one of the requests through the processing system, the tracking token having a format acceptable by protocols of the processing system, the tracking token comprising the first stakeholder token, the second stakeholder token, and a unique correlator. The method includes transmitting the requests to the processing system, such that the tracking token is associated with the at least one of the requests in the processing system. Also, the method includes enabling access to tracking information generated by the processing system associated with the at least one of the requests for the first monitoring agent based on the first stakeholder token and for the second monitoring agent based on the second stakeholder token.

A non-limiting example computer-implemented method includes receiving, by a computer system, a request to be executed by a processing system, receiving a first stakeholder token from a first monitoring agent and a second stakeholder token from a second monitoring agent, and building a tracking token for tracking the request through the processing system, the tracking token comprising the first stakeholder token, the second stakeholder token, and a unique correlator. The method includes associating the tracking token with the request, transmitting both the request and the tracking token to the processing system, and providing tracking information generated by the processing system for the request to the first monitoring agent based on the first stakeholder token and to the second monitoring agent based on the second stakeholder token.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 is a flow diagram of a method for selective tracking of requests through enterprise systems by multiple vendors with a single tracking token scheme in accordance with one or more embodiments of the present invention.

DETAILED DESCRIPTION

Figure 1:
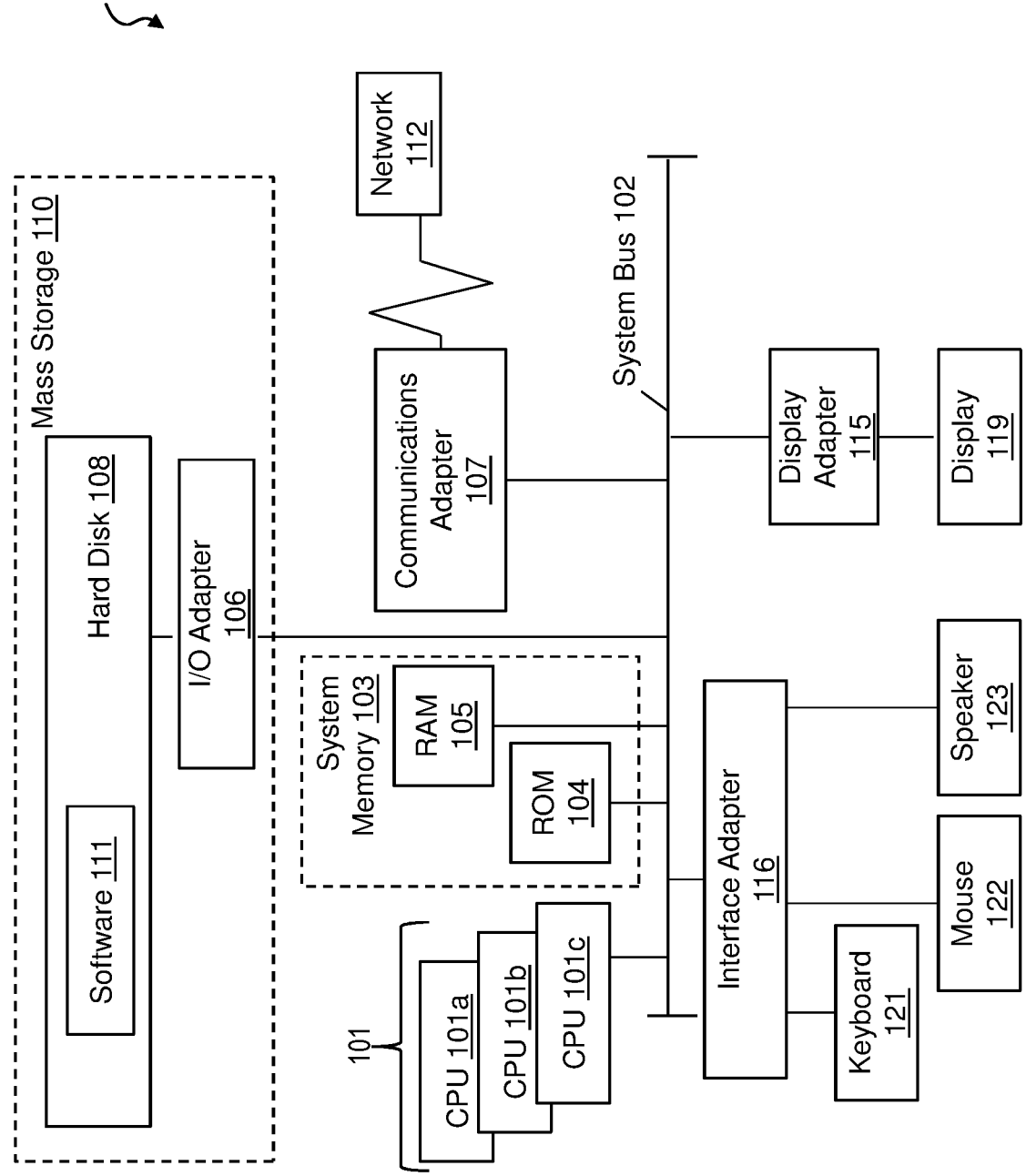
FIG. 1 is a block diagram of an example computer system for use in conjunction with one or more embodiments of the present invention.

One or more embodiments of the present invention provide support for selective tracking of requests through enterprise software systems by multiple vendors with a single tracking token scheme.

In computing, a legacy system is an old method, technology, computer system, or application program of or related to an outdated computer system but still in use. Often referencing a system as "legacy" means that it paved the way for the standards that would follow it. Legacy is commonly used to refer to existing computer systems to distinguish them from the design and implementation of new systems. While the system may seem to be out of date for some reason, a legacy system can continue to be used for a variety of reasons. The decision to keep an old system may be influenced by the inherent challenges of change management, or a variety of other reasons other than functionality. The costs of redesigning or replacing the system may be prohibitive because it is large, monolithic, and/or complex. In addition, or alternatively, the system may require near-constant availability, so it cannot be taken out of service, and the cost of designing a new system with a similar availability level may be high. Examples of legacy systems include systems to handle customers' accounts in banks, computer reservations systems, air traffic control systems, energy distribution (power grids) systems, etc. Accordingly, backward compatibility (such as the ability of newer systems to handle legacy file formats and character encodings) is a goal that software developers often include in their work.

Many enterprise systems are and/or include legacy systems, and vendors want to track requests through the legacy systems in the enterprise systems. Enterprise transaction processing systems can require monitoring agents from different monitoring products to be deployed to track requests as they pass from one system to another. Typically, more than one monitoring solution is employed to provide different types of analytical data from cross enterprise views down to individual systems. Enterprise middleware components traditionally provide a unilateral approach to correlating requests across component boundaries (if at all), and cannot accommodate multiple vendors wishing to inhabit the same single limited facility (e.g., older communication protocols typically have only a single field for conveying tracking information) provided within the available protocol. Monitoring solutions can be designed to see all requests to enable general problem resolution, or alternatively track selected samples of the request workload to provide a system health indicator. However, tracking all requests can be too costly in terms of system resources, particularly data storage, in enterprise systems because the enterprise transaction system can have millions of transactions per second.

One or more embodiments of the present invention address one or more of the above-described shortcomings of the prior art by enabling multiple vendors to independently and selectively express an interest in any particular request, on a request-by-request basis, allowing co-existence of monitoring solutions from multiple vendors, using a selective tracking mechanism. A unique correlator is required to be flowed with the tracking information to identify each specific request. In accordance with one or more embodiments of the present invention, monitoring agents can indicate to the selective tracking mechanism whether or not to track any particular request, and if the request is to be tracked, can optionally supply additional stakeholder details about the type of tracking required. For example, the optional data might indicate the level of detail required to be captured in the systems that the request flows through.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
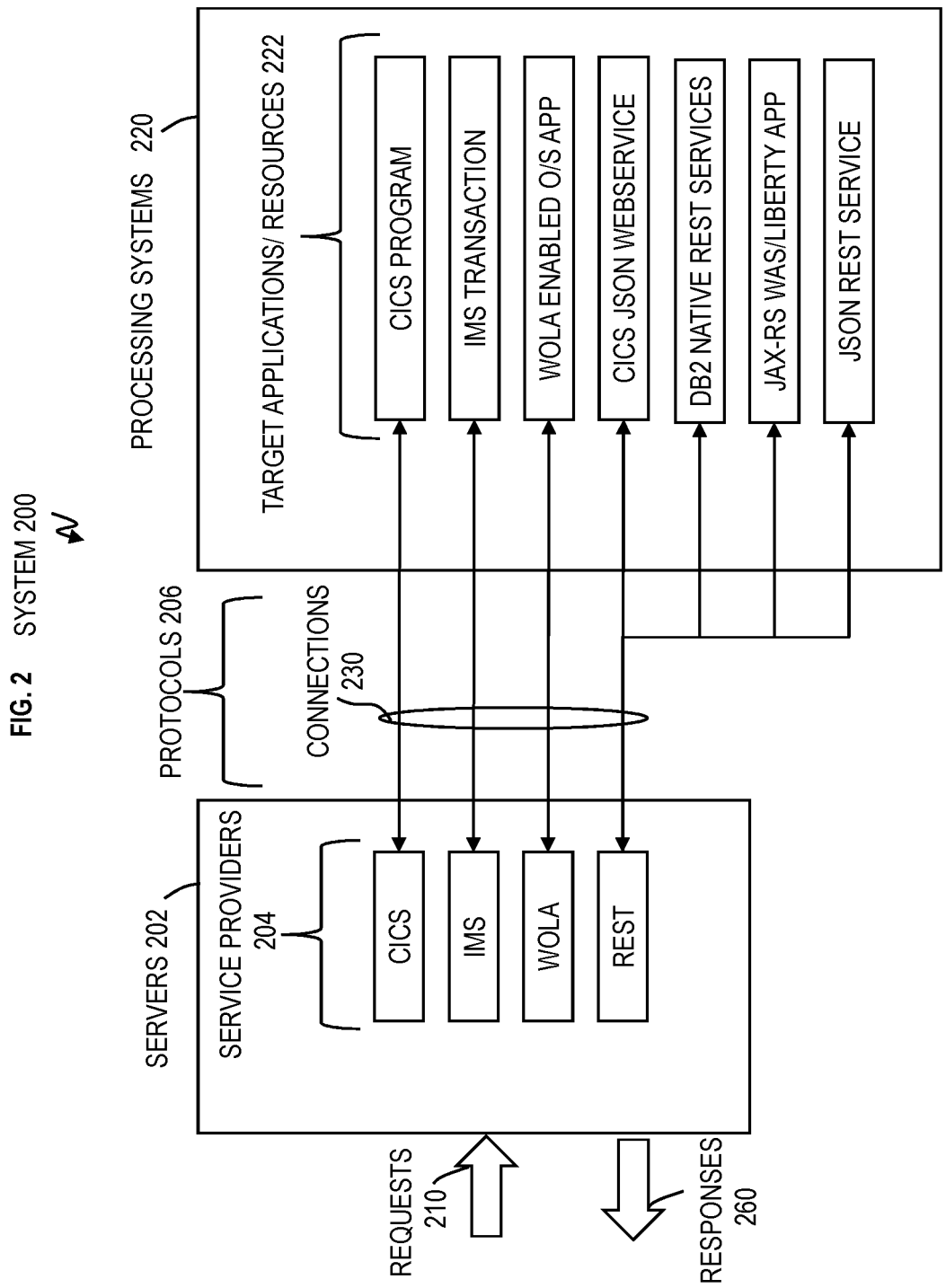
FIG. 2 is a block diagram of an example enterprise system in accordance with one or more embodiments of the present invention.

FIG. 2 is a block diagram of an example enterprise system 200 in accordance with one or more embodiments of the present invention. The enterprise system 200 includes numerous servers 202 coupled to various processing systems 220. The computer system 100 and/or hardware and software elements of the computer system 100 can be included in servers 202 and processing systems 220 such that servers 202 and processing systems 220 operate/function as discussed herein. The servers 202 and processing systems 220 can include software 111 for execution on the various computer systems 100. The software 111 may be stored in the mass storage 110, where the software 111 is stored as instructions for execution by the processors 101 to operate/function as discussed herein.

The processing systems 220 may include a legacy computer system having legacy or older software and/or older hardware, which operate using older/different protocols than more modern software. Accordingly, the servers 202 operate as a modern interface to access the processing systems 220 via connections 230. The servers 202 can include, for example, z/OS® Connect Enterprise Edition software. Each of the connections 230 can include cables/wires and/or bundles of cables/wires between the servers 202 and the processing systems 220. The connections 230 can operate using various software connections such as, for example, transmission control protocol/Internet protocol (TCP/IP) connections, Hypertext Transfer Protocol (HTTP) connections, etc. The processing systems 220 can include mainframes and are configured to process the requests 210 to provide output responses 260. Examples of the output responses 260 may include the response from a business transaction such as the name and address of a client.

The processing systems 220 are backend computer systems which process millions of transactions per second for requests 210. For example, a server 202 can receive numerous requests 210, which can be application workload requests. The server 202 has service providers 204 configured to translate the request into the formats and/or protocols 206 required to be processed by the different software applications and/or operating systems (O/S) utilized by the target applications and/or resources 222 of the processing systems 220. The service providers 204 can be modules which use implementations of protocols for communicating and interacting with target applications and/or resources 222. Each of the different service providers 204 is operatively connected to its own corresponding target applications and/or resources 222 which operate using the same format and/or protocols 206.

The target applications and/or resources 222 include software such as databases, operating systems, etc., and hardware such as memory devices, network interfaces, etc. Examples types of formats and/or protocols 206 on which target applications and/or resources 222 can be based on include Hypertext Transfer Protocol (HTTP), WebSphere® Optimized Local Adapters (OLA or WOLA), IP interconnectivity (IPIC), etc. Although example formats and/or protocols 206 are illustrated for explanation purposes, these examples are not meant to be limiting and it should be appreciated that other formats and/or protocols 206 can be utilized.

As noted herein, the processing systems 220 can process millions of transactions per second, and there may be occasions in which a vendor wants to monitor one or more requests 210 to evaluate how the request 210 is being processed. In particular, the vendor desires to be selective in the request 210 that it monitors through the processing systems 220. As noted above, monitoring solutions can be designed to see all requests 210 to enable general problem resolution, or alternatively track selected samples of the request workload. However, this can still be too many requests 210 to monitor when the vendor only is interested in a specific (i.e., single) request 210 out of millions of requests 210 and/or interested in a specific few requests 210, and the vendor does not want track every single request 210. Additionally, when a vendor desires to monitor requests 210, the vendor takes over an entire service provider 204 related to a specific format and/or protocol 206 (along with the particular target applications and/or resources 222 connected to that particular service provider 204), which excludes another vendor from monitoring the same service provider 204 (and/or particular target applications and/or resources 222 connected to the particular connection) for that specific format and/or protocol 206.

Figure 3:
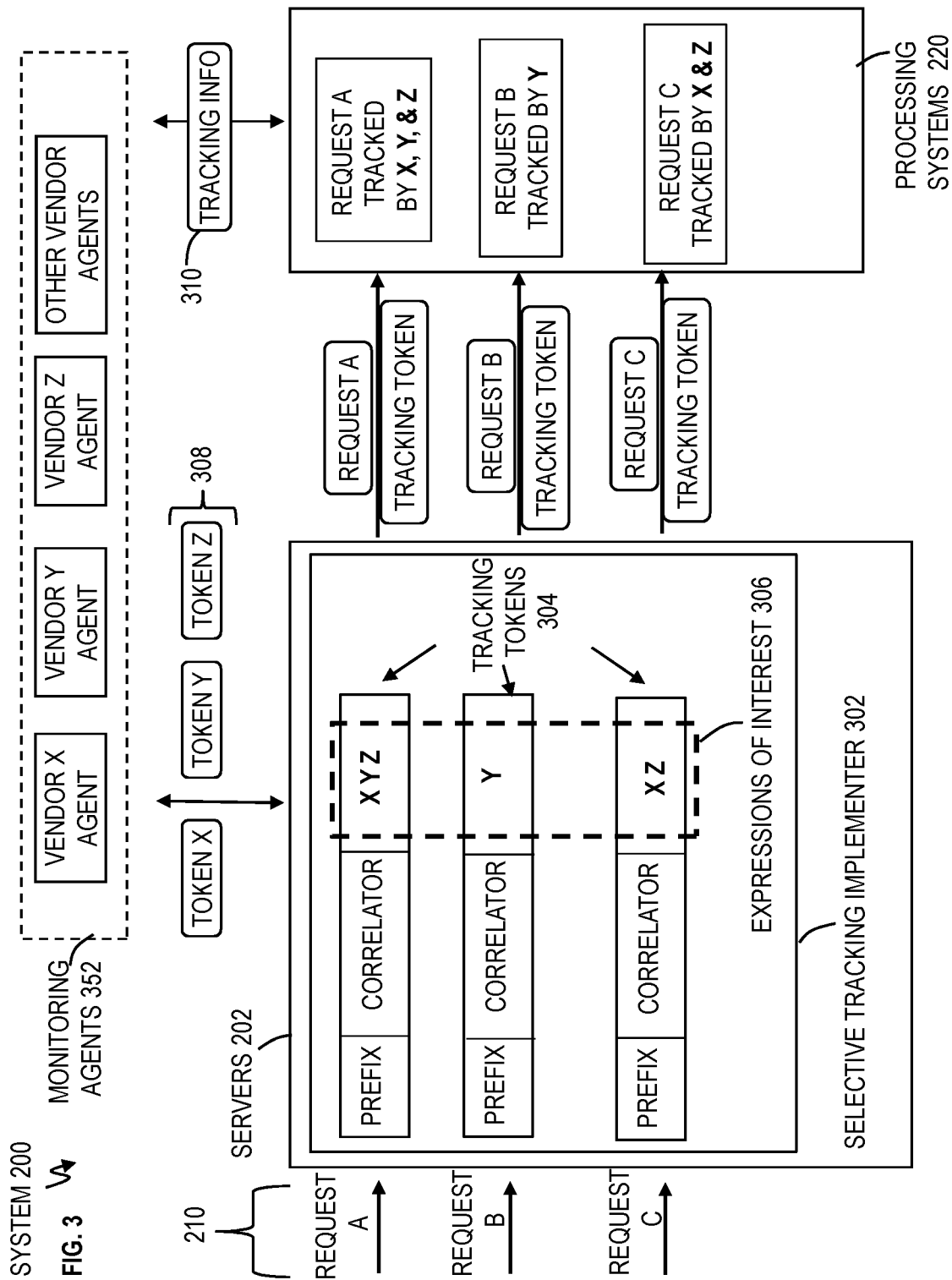
FIG. 3 is a block diagram with further details of the example enterprise system in accordance with one or more embodiments of the present invention.

FIG. 3 is a block diagram illustrating multiple vendor selective request tracking in accordance with one or more embodiments of the present invention. Some details of FIG. 2 may not be shown in FIG. 3 so as not to obscure the figure, but it should be appreciated that they are understood to be included in FIG. 3. FIG. 3 illustrates how multiple vendors using their own monitoring agent 352 can independently and selectively express an interest in any particular request 210, on a request-by-request basis, allowing co-existence of monitoring solutions from multiple vendors, within a single system.

Monitoring agents 352 represent different monitoring agents for different vendors, such as vendor X, vendor Y, vendor Z, and other vendors who can selectively and concurrently monitor desired requests 210 through processing systems 220. Although monitoring agents 352 are shown as being grouped in a dashed box for illustration purposes, it should be understood that each of the monitoring agents 352 is independent of one another. Each vendor typically provides a pair of agents, one for the servers 202 and one for the processing system 220. For example, each of the independent monitoring agents 352 can include the computer system 100 and/or hardware and software elements of the computer system 100 are included in respective monitoring agents 352 such that monitoring agents 352 operate/function as discussed herein. The monitoring agents 352 can include software 111 for execution on the various computer systems 100. The software 111 may be stored in the mass storage 110, where the software 111 is stored as instructions for execution by the processors 101 to operate/function as discussed herein. The monitoring agents 352 interface with servers 202 and processing systems 220. In one example, the monitoring agents 352 can be implemented as a plug-in to a monitoring interface in the servers 202 and/or processing system 220.

The servers 202 include a selective tracking implementer 302 which can generally be referred to as a middleware component. The selective tracking implementer 302 may be a module that runs on the servers 202. Additionally, the selective tracking implementer 302 can be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein can be a combination of hardware and programming. The programming can be processor executable instructions stored on a tangible memory, and the hardware can include processing circuitry for executing those instructions. Alternatively or additionally, the selective tracking implementer 302 can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Monitoring agents 352 of vendors can register with the selective tracking implementer 302 implementing tracking token creation. The selective tracking implementer 302 ensures monitoring agents 352 use a unique stakeholder token 308 to avoid conflicts. For example, vendor X monitoring agent can register with unique stakeholder token X, vendor Y monitoring agent can register with unique stakeholder token Y, vendor Z monitoring agent can register with unique stakeholder token Z, etc. In one or more embodiments, the unique stakeholder tokens 308 can be a unique alphanumeric number, unique numerical value, etc. The selective tracking implementer 302 can choose to flow and/or reject stakeholder tokens of unregistered monitoring agents, and can provide a registration process via a manual and/or automated process.

The selective tracking implementer 302 is configured to provide a mechanism for monitoring agents 352 to specify the stakeholder token 308 identifying the particular vendor product (e.g., the particular target applications and/or resources 222) and optional stakeholder tracking instructions for each request 210 flowing into and/or originating from that product (i.e., particular target applications and/or resources 222). The selective tracking implementer 302 is configured to combine the stakeholder tracking information with a system wide unique correlator, and the selective tracking implementer 302 forwards this as a tracking token 304, with the original request 210, to the processing systems 220. Monitoring agents 352 from different vendors deployed in the processing systems 220 can then inspect the tracking information 310 pertinent to them and selectively gather the required tracking information 310.

Any monitoring agent 352 that does not support selective tracking and tracks all requests 210 without needing to specify information on how requests 210 are to be tracked does not need to supply a stakeholder token 308 to the selective tracking implementer 302. In this case, the unique correlator is sufficient in its own right to track the request.

Although an example scenario is provided below, it should be appreciated that the example scenario is for explanation purposes and not limitation. The monitoring agents 352 each register with the selective tracking implementer 302 (i.e., API gateway, middleware component, etc.). For example, vendor X monitoring agent registers token X with selective tracking implementer 302, vendor Y monitoring agent registers token Y, vendor Z monitoring agents registers token Z; selective tracking implementer 302 determines whether any of the stakeholder tokens conflict (e.g., whether the stakeholder tokens have the same alphanumeric number). It is assumed that the requests 210 include request A, request B, and request C, along with numerous other requests. When a request 210 is received from one or more computer systems (e.g., such as computer system 100) by the selective tracking implementer 302, the selective tracking implementer 302 is configured to invoke/call any monitoring agents 352 such as those associated vendor X, vendor Y, vendor Z, etc., and then provide the monitoring agents 352 with correlators unique to each request 210 (e.g., requests A, B, C). In other words, the selective tracking implementer 302 provides request information per request 210 to the monitoring agents 352 so monitoring agents 352 can evaluate whether to track or not track per request 210. Each of the monitoring agents 352 receives the same unique correlator for request A, another unique correlator for request B, and another unique correlator for request C, and no request 210 has the same correlator. Each correlator is associated with and identifies its own request 210. The correlator can be a unique number, an alphanumerical number, etc. The monitoring agents 352 can express an interest in the desired request 210 by sending their respective stakeholder token back to the selective tracking implementer 302, such that the monitoring agents 352 can track the desired request 210. For request A, the selective tracking implementer 302 receives stakeholder token X from vendor X monitoring agent, stakeholder token Y from vendor Y monitoring agent, and stakeholder token Z from vendor Z monitoring agent, where each stakeholder token is unique to the particular vendor monitoring agent 352. For request B, the selective tracking implementer 302 receives stakeholder token Y from vendor Y monitoring agent. For request C, the selective tracking implementer 302 receives stakeholder token X from vendor X monitoring agent and stakeholder token Z from vendor Z monitoring agent.

Figure 4:
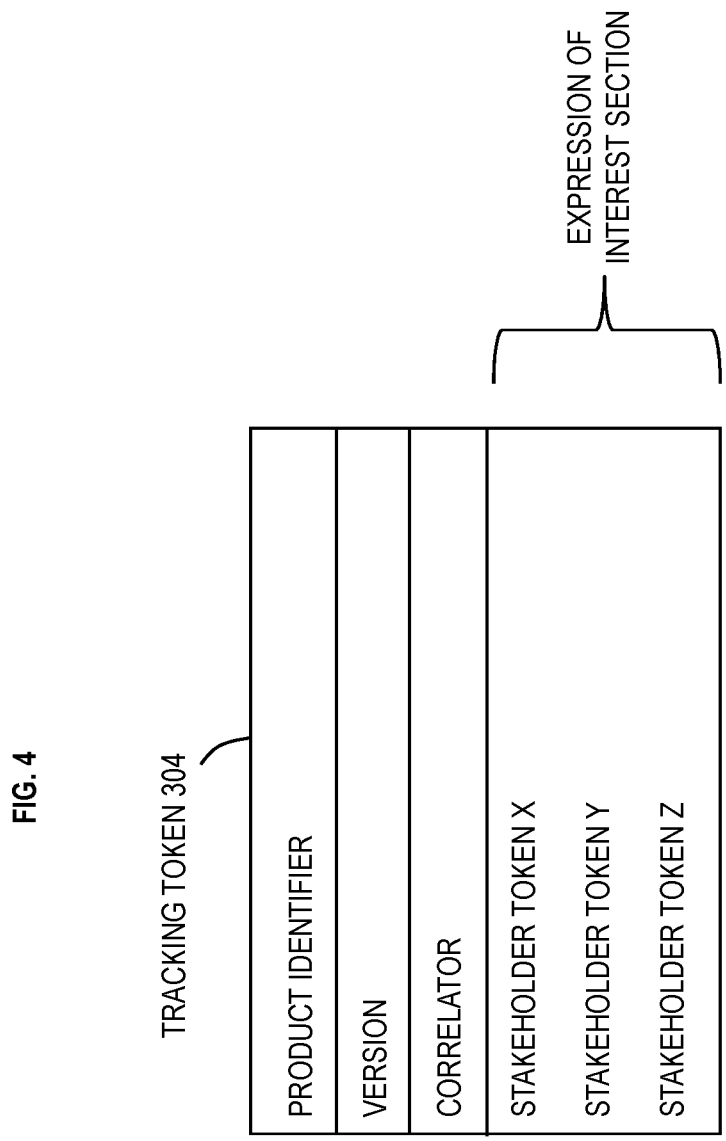
FIG. 4 is a block diagram of an example tracking token in accordance with one or more embodiments of the present invention.

The selective tracking implementer 302 is configured to build a respective tracking token 304 for each of the requests 210. An example tracking token 304 is depicted in FIG. 4. The selective tracking implementer 302 includes in the tracking token 304 the stakeholder tokens 308 from those vendor agents expressing an interest in the requests 210. Each tracking token 304 for each request 210 has an expression of interest section 306, and the expression of interest section 306 provides all monitoring agents 352 (i.e., for each individual vendor) an equal opportunity to monitor any desired request 210 (which can be the same request in some cases). For example, the tracking token 304 for request A is illustrated with three stakeholder tokens 308, which are stakeholder token X, stakeholder token Y, and stakeholder token Z. It should be appreciated that more or fewer than three stakeholder tokens could be included the expressions of interest section 306 for a particular tracking token 304. The tracking token 304 for request B is illustrated with a single stakeholder token 308, which is stakeholder token Y. The tracking token 304 for request C is illustrated with two stakeholder tokens 308, which are stakeholder token X and stakeholder token Z.

In addition to the expression of interest section 306, the tracking tokens 304 include a correlator field which has a unique value. The tracking tokens 304 can also include a prefix field that has the product identifier. The product identifier identifies the selective tracking implementer 302 (e.g., an API gateway) building the tracking token 304. Because there are numerous servers 202 and each can have its own selective tracking implementer 302, the prefix field identifies the particular selective tracking implementer 302. Optionally, the prefix field can identify the server 202 (or computer system 100) on which the selective tracking implementer 302 resides. In one or more embodiments, the selective tracking implementer 302 can be distributed across more than one server 202 and those servers 202 can each be identified along with the selective tracking implementer 302 executing on them. The tracking tokens 304 can have additional information including the version of the tracking token specification to allow for future changes in the content of the tracking token. For example, in a new version when sending the stakeholder token 308 back to the selective tracking implementer 302, the monitoring agents 352 can optionally include stakeholder tracking instructions, e.g., level of tracking required.

Once the selective tracking implementer 302 builds the tracking token 304 formatted/modified to the proper the network format and/or protocol 206 used to communicate with target application and/or resource 222 (i.e., the target system) on the processing system 220, the tracking token 304 is sent to the target application and/or resource 222 on the processing system 220 (i.e., the target system, such as an application server or database) with the particular request 210. For example, the tracking token 304 can be combined and/or associated with the request 210. The protocol used has an existing slot for passing a tracking token. In one case, the tracking token 304 can be appended to the end of the request 210 and/or embedded within the request 210. For example, in a HTTP request there may be a specific header which holds tracking data (e.g., tracking token 304). If the request 210 is subsequently forwarded to another one of the processing systems 220, the tracking token 304 is forwarded with the request 210. In the example scenario, request A along with its associated tracking token 304 is sent to the processing system 220. During the processing of requests 210 by processing systems 220, the respective tracking tokens 304 enable tracking information to be captured for respective requests 210.

The respective monitoring agents 352 check the respective expressions of interest fields 306 for each of the requests 210 to determine if the request 210 is one that is being tracked by the respective monitoring agent 352. In one case, the monitoring agents 352 can continuously check for its unique stakeholder token 304 on each request 210. Additionally and/or alternatively, the processing system 220 could check all the stakeholder tokens and call the monitoring agent 352 which registered the associated stakeholder token 308. For each tracking token 304 found to have the stakeholder token 308 of a particular monitoring agent 352, the monitoring agent 352 pulls/copies the tracking information 310 associated with the particular tracking token 304 and request 210. For example, vendor X monitoring agent checks for and recognizes its stakeholder token X in the expressions of interest section 306 for the tracking token 304 for request A, and accordingly, vendor X monitoring agent pulls/copies the tracking information 310 for request A. The tracking information 310 includes the correlator and can include timestamps, resources accessed such as names of databases, the user identity, files accessed, etc. The vendor monitoring agent will export the information using a method and form suitable for its purposes; for example, the vendor monitoring agent may export tracking information 310 to a file or pass the tracking information 310 to an analytical processor.

There can be some requests 210 for which no monitoring agents 352 expressed an interest, and accordingly, the selective tracking implementer 302 may not build tracking tokens 304 or the selective tracking implementer 302 may build tracking tokens 304 with no stakeholder tokens for these requests 210. When building tracking tokens 304 with no stakeholder tokens, this may be used when there are monitoring agents 352 which track all requests 210, and these monitoring agents 352 never (need to) specify an interest (stakeholder token) as they are always interested. Although examples have treated the expressions of interest as opting in to track the request 210, there can be one or more embodiments in where the monitoring agent uses the stakeholder token for the opposite meaning and where monitoring agent may choose to track requests that is has not attached a stakeholder token to and ignore requests it has attached the stakeholder token to.

Figure 5:
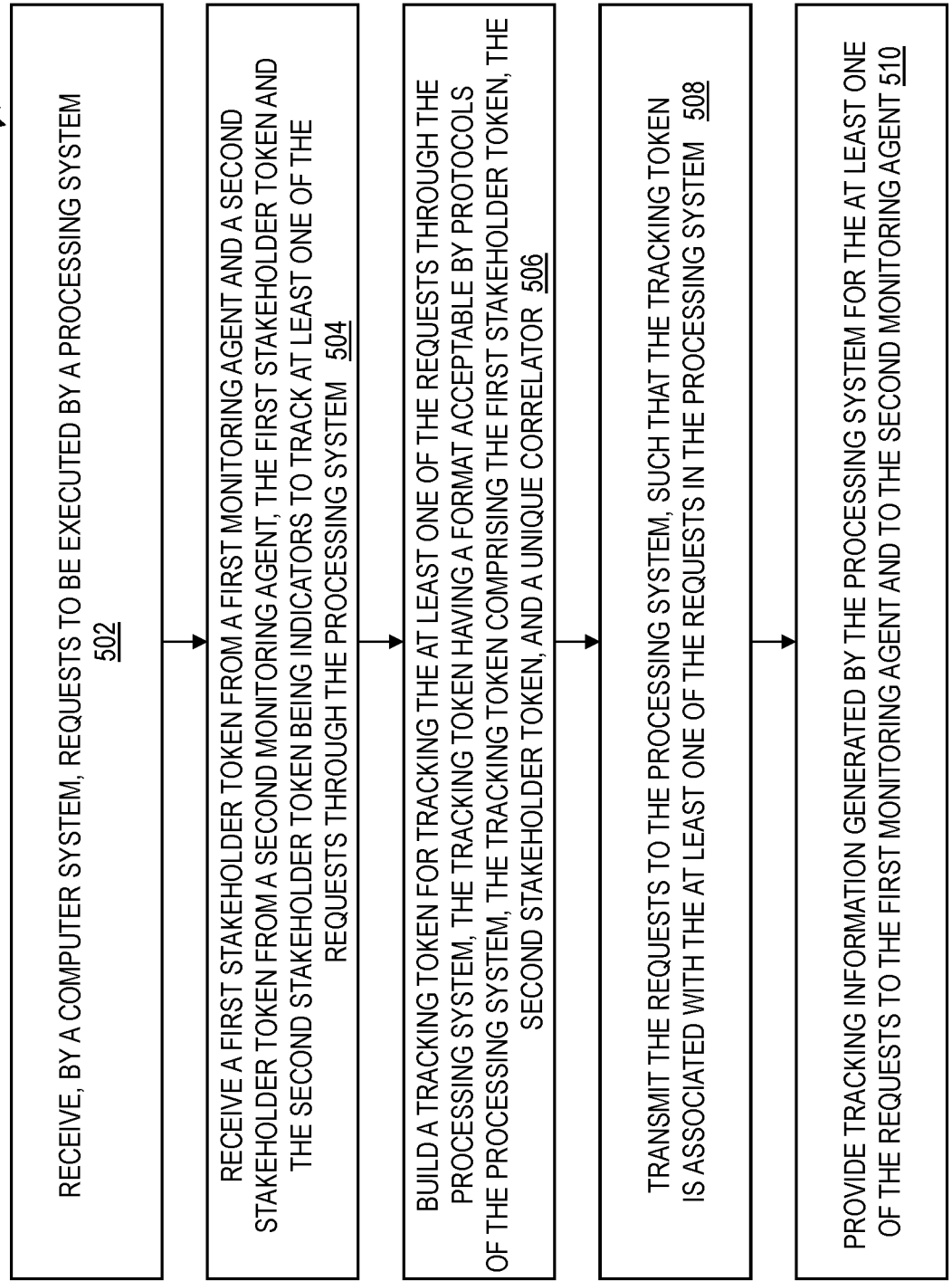
FIG. 5 is a flow diagram of a method for selective tracking of requests through enterprise systems by multiple vendors with a single tracking token scheme in accordance with one or more embodiments of the present invention.

FIG. 5 is a flow diagram of a computer-implemented method of multiple vendor selective request tracking in accordance with one or more embodiments of the present invention. Reference can be made to any of the figures discussed herein. At block 502, the method 500 includes receiving, by a computer system (e.g., servers 202), requests 210 to be executed by a processing system 220. At block 504, the method 500 includes receiving (e.g., via servers 202) a first stakeholder token from a first monitoring agent (e.g., receiving stakeholder token X from vendor X monitoring agent) and a second stakeholder token from a second monitoring agent (e.g., receiving stakeholder token Y from vendor Y monitoring agent), the first stakeholder token and the second stakeholder token being indicators to track at least one of the requests through the processing system 220.

At block 506, the method 500 includes building (e.g., by the selective tracking implementer 302 of servers 202) a respective tracking token 304 for tracking each of the at least one of the requests (e.g., an individual tracking token 304 for each of the requests A, B, or C) through the processing system 220, the tracking token 304 having a format acceptable by protocols of the processing system 220, the tracking token 304 having the first stakeholder token (e.g., stakeholder token X), the second stakeholder token (e.g., stakeholder token Y), and a unique correlator. At block 508, the method 500 includes transmitting (e.g., via servers 202) the requests 210 to the processing system 220, such that the respective tracking token 304 is associated with the at least one of the requests 210 in the processing system 220 (e.g., each of the requests A, B, and C has its own individual tracking token 304). At block 510, the method 500 includes enabling access to and/or providing (e.g., via servers 202 or by the servers 202 causing the processing systems 220 to provide) tracking information 310 generated by the processing system 220 for the at least one of the requests 210 to all the monitoring agents (e.g., vendor X and vendor Y monitoring agents). The monitoring agents process the tracking information if their stakeholder token is present. For example, the first monitoring agent (e.g. vendor X monitoring agent) processes the tracking information 310 based on the first stakeholder token (e.g., token X) and the second monitoring agent (e.g., vendor Y monitoring agent) processes the tracking information 310 based on the second stakeholder token (e.g., token Y). Further, it should be appreciated that all monitoring agents 352 are called and given information about the request 210 and the tracking token 304. The monitoring agents 352 inspect the tracking token 304 to see if their stakeholder token is present and based on that decide whether to record tracking information 310 or not. The processing system 220 does not need to be aware of the contents of tracking tokens 310.

The computer system (e.g., the server 202) is configured to inquire of the first monitoring agent and the second monitoring agent regarding an expression of interest for the at least one of the requests 210. The computer system (e.g., server 202) is configured to receive the first stakeholder token (e.g., token X) from the first monitoring agent (e.g., vendor X monitoring agent) and the second stakeholder token (e.g., token Y) from the second monitoring agent (e.g., vendor Y monitoring agent) is in response to the computer system (e.g., server 202) inquiring of the first monitoring agent and the second monitoring agent regarding the at least one of the requests.

The tracking information 310 is provided for the at least one of the requests to the first monitoring agent and to the second monitoring agent (e.g., vendor X monitoring agent and vendor Y monitoring agent) in response to the first monitoring agent and the second monitoring agent respectively identifying the first stakeholder token (e.g., token X) and the second stakeholder token (e.g., token Y) in the tracking token 304 having been processed with the at least one of the requests 210.

The first stakeholder token and the second stakeholder token are each unique values. The tracking token 304 is configured to include one or more additional stakeholder tokens 308. The additional stakeholder tokens are the indicators from one or more additional monitoring agents (e.g., other vendor agents) to track the at least one of the requests 210. The requests 210 are application workload requests to target resources (e.g., target applications and/or resources 222) on the processing systems 220.

FIG. 6 is a flow diagram of a computer-implemented method 600 of multiple vendor selective request tracking in accordance with one or more embodiments of the present invention. Reference can be made to any of the figures discussed herein. At block 602, the method 600 includes receiving, by a computer system (e.g., server 202), a request 210 to be executed by a processing system 220. At block 604, the method 600 includes receiving (e.g., via servers 202) a first stakeholder token from a first monitoring agent (e.g., receiving stakeholder token X from vendor X monitoring agent) and a second stakeholder token from a second monitoring agent (e.g., receiving stakeholder token Y from vendor Y monitoring agent). At block 606, the method 600 includes building (e.g., via servers 202) a tracking token 304 for tracking the request 210 through the processing system 220, the tracking token 304 including the first stakeholder token, the second stakeholder token, and a unique correlator. At block 608, the method 600 includes associating (e.g., via servers 202) the tracking token 304 with the request 210 (e.g., request A). At block 610, the method 600 includes transmitting (e.g., via servers 202) both the request 210 (e.g., request A) and its associated tracking token 304 together to the processing system 220. At block 612, the method 600 includes enabling access to and/or providing (e.g., via servers 202 or by the servers 202 causing the processing system 220 to provide) tracking information 310 generated by the processing system 220 for the request 210 (e.g., request A) to all monitoring agents. For example, the first monitoring agent (e.g. vendor X monitoring agent) processes the tracking information based on the first stakeholder token and the second monitoring agent (e.g., vendor Y monitoring agent) based on the second stakeholder token.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a computer system, requests to be executed by a processing system;
   receiving a first stakeholder token from a first monitoring agent and a second stakeholder token from a second monitoring agent, the first stakeholder token and the second stakeholder token being indicators to track at least one of the requests through the processing system;
   building a tracking token for tracking the at least one of the requests through the processing system, the tracking token having a format acceptable by protocols of the processing system, the tracking token comprising the first stakeholder token, the second stakeholder token, and a unique correlator;
   transmitting the requests to the processing system, such that the tracking token is associated with the at least one of the requests in the processing system; and
   enabling access to tracking information generated by the processing system associated with the at least one of the requests for the first monitoring agent based on the first stakeholder token and for the second monitoring agent based on the second stakeholder token.

2. The method of claim 1, wherein the computer system is configured to inquire of the first monitoring agent and the second monitoring agent regarding an expression of interest for the at least one of the requests.

3. The method of claim 1, wherein receiving the first stakeholder token from the first monitoring agent and the second stakeholder token from the second monitoring agent is in response to the computer system inquiring of the first monitoring agent and the second monitoring agent regarding the at least one of the requests.

4. The method of claim 1, wherein the tracking information is provided for the at least one of the requests to the first monitoring agent and to the second monitoring agent in response to the first monitoring agent and the second monitoring agent respectively identifying the first stakeholder token and the second stakeholder token in the tracking token having been processed for the at least one of the requests.

5. The method of claim 1, wherein the protocols are specific to a target resource of the processing system.

6. The method of claim 1, wherein receiving the first stakeholder token from the first monitoring agent and the second stakeholder token from the second monitoring agent is in response to providing request information associated with the requests to the first and second monitoring agents, thereby allowing the first and second monitoring agents to evaluate whether or not to track any of the requests.

7. The method of claim 1, wherein the first stakeholder token and the second stakeholder token are each unique values.

8. The method of claim 1, wherein the tracking token is configured to comprise one or more additional stakeholder tokens.

9. The method of claim 8, wherein the one or more additional stakeholder tokens are the indicators from one or more additional monitoring agents to track the at least one of the requests.

10. The method of claim 1, wherein the requests are application workload requests to target resources on the processing system.

11. A system comprising:
    a memory having computer readable instructions; and
    one or more processors for executing the computer readable instructions, the computer readable instructions controlling the one or more processors to perform operations comprising:
    receiving requests to be executed by a processing system;
    receiving a first stakeholder token from a first monitoring agent and a second stakeholder token from a second monitoring agent, the first stakeholder token and the second stakeholder token being indicators to track at least one of the requests through the processing system;

building a tracking token for tracking the at least one of the requests through the processing system, the tracking token having a format acceptable by protocols of the processing system, the tracking token comprising the first stakeholder token, the second stakeholder token, and a unique correlator;

transmitting the requests to the processing system, such that the tracking token is associated with the at least one of the requests in the processing system; and enabling access to tracking information generated by the processing system associated with the at least one of the requests for the first monitoring agent based on the first stakeholder token and for the second monitoring agent based on the second stakeholder token.

12. The system of claim 11, wherein the one or more processors are configured to inquire of the first monitoring agent and the second monitoring agent regarding an expression of interest for the at least one of the requests.

13. The system of claim 11, wherein receiving the first stakeholder token from the first monitoring agent and the second stakeholder token from the second monitoring agent is in response to the one or more processors inquiring of the first monitoring agent and the second monitoring agent regarding the at least one of the requests.

14. The system of claim 11, wherein the tracking information is provided for the at least one of the requests to the first monitoring agent and to the second monitoring agent in response to the first monitoring agent and the second monitoring agent respectively identifying the first stakeholder token and the second stakeholder token in the tracking token having been processed for the at least one of the requests.

15. The system of claim 11, wherein:
the protocols are specific to a target resource of the processing system;
receiving the first stakeholder token from the first monitoring agent and the second stakeholder token from the second monitoring agent is in response to providing request information associated with the requests to the first and second monitoring agents, thereby allowing the first and second monitoring agents to evaluate whether or not to track any of the requests; and
the first stakeholder token and the second stakeholder token are each unique values.

16. The system of claim 11, wherein the tracking token is configured to comprise one or more additional stakeholder tokens, the one or more additional stakeholder tokens being the indicators from one or more additional monitoring agents to track the at least one of the requests.

17. The system of claim 11, wherein the requests are application workload requests to target resources on the processing system.

18. A computer program product comprising a computer readable storage medium having program instructions embodied therewith, the program instructions executable by a processor to cause the processor to perform operations comprising:

receiving requests to be executed by a processing system;
receiving a first stakeholder token from a first monitoring agent and a second stakeholder token from a second monitoring agent, the first stakeholder token and the second stakeholder token being indicators to track at least one of the requests through the processing system;
building a tracking token for tracking the at least one of the requests through the processing system, the tracking token having a format acceptable by protocols of the processing system, the tracking token comprising the first stakeholder token, the second stakeholder token, and a unique correlator;

transmitting the requests to the processing system, such that the tracking token is associated with the at least one of the requests in the processing system; and providing tracking information generated by the processing system for the at least one of the requests to the first monitoring agent based on the first stakeholder token and to the second monitoring agent based on the second stakeholder token.

19. The computer program product of claim 18, wherein the processor is configured to inquire of the first monitoring agent and the second monitoring agent regarding an expression of interest for the at least one of the requests.

20. The computer program product of claim 18, wherein receiving the first stakeholder token from the first monitoring agent and the second stakeholder token from the second monitoring agent is in response to the processor inquiring of the first monitoring agent and the second monitoring agent regarding the at least one of the requests.

21. The computer program product of claim 18, wherein the tracking information is provided for the at least one of the requests to the first monitoring agent and to the second monitoring agent in response to the first monitoring agent and the second monitoring agent respectively identifying the first stakeholder token and the second stakeholder token in the tracking token having been processed for the at least one of the requests.

22. The computer program product of claim 18, wherein the protocols are specific to a target resource of the processing system.

23. The computer program product of claim 18, wherein the at least one of the requests comprises the protocols.

24. A computer-implemented method comprising:
receiving, by a computer system, a request to be executed by a processing system;
receiving a first stakeholder token from a first monitoring agent and a second stakeholder token from a second monitoring agent;
building a tracking token for tracking the request through the processing system, the tracking token comprising the first stakeholder token, the second stakeholder token, and a unique correlator;
associating the tracking token with the request;
transmitting both the request and the tracking token to the processing system; and
providing tracking information generated by the processing system for the request to the first monitoring agent based on the first stakeholder token and to the second monitoring agent based on the second stakeholder token.

25. A system comprising:
a memory having computer readable instructions; and
one or more processors for executing the computer readable instructions, the computer readable instructions controlling the one or more processors to perform operations comprising:
receiving a request to be executed by a processing system;
receiving a first stakeholder token from a first monitoring agent and a second stakeholder token from a second monitoring agent;
building a tracking token for tracking the request through the processing system, the tracking token comprising the first stakeholder token, the second stakeholder token, and a unique correlator;
associating the tracking token with the request;
transmitting both the request and the tracking token to the processing system; and
providing tracking information generated by the processing system for the request to the first monitoring agent based on the first stakeholder token and to the second monitoring agent based on the second stakeholder token.

* * * * *